US006775966B2

(12) United States Patent
Frego

(10) Patent No.: US 6,775,966 B2
(45) Date of Patent: Aug. 17, 2004

(54) INTEGRATED COMBINE REEL DRIVE SYSTEM

(75) Inventor: Jeffrey D. Frego, Willowstreet, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/020,152

(22) Filed: Dec. 18, 2001

(65) Prior Publication Data

US 2003/0110749 A1 Jun. 19, 2003

(51) Int. Cl.$^7$ .............................................. A01D 69/03
(52) U.S. Cl. .......................... 56/10.9; 56/11.9; 56/220
(58) Field of Search .............................. 56/10.8, 10.9, 56/11.9, 126, 219, 220, 221, 222, DIG. 11; 60/428, 484, 486

(56) References Cited

U.S. PATENT DOCUMENTS

| | | | | |
|---|---|---|---|---|
| 2,766,572 A | * | 10/1956 | Vogelaar ..................... | 56/10.7 |
| 4,332,262 A | | 6/1982 | De Busscher | |
| 4,487,004 A | | 12/1984 | Kejr | |
| 4,967,544 A | * | 11/1990 | Ziegler et al. ........... | 56/10.2 R |
| 4,967,863 A | * | 11/1990 | Teijido et al. ............. | 180/53.1 |
| 5,077,972 A | * | 1/1992 | Bianchetta et al. ........... | 60/427 |
| 5,488,817 A | * | 2/1996 | Paquet et al. ............ | 56/10.2 R |
| 5,577,435 A | * | 11/1996 | Kowalyk et al. ............. | 91/516 |
| 5,832,705 A | * | 11/1998 | Eis et al. ..................... | 56/14.9 |
| 5,865,700 A | | 2/1999 | Horsch | |
| 6,116,006 A | * | 9/2000 | Killen et al. ................. | 56/11.9 |
| 6,145,287 A | * | 11/2000 | Rosskopf .................... | 56/10.9 |
| 6,216,456 B1 | * | 4/2001 | Mitchell ...................... | 60/452 |
| 6,223,848 B1 | | 5/2001 | Young et al. | |
| 6,247,295 B1 | | 6/2001 | Hansen et al. | |
| 6,334,308 B1 | * | 1/2002 | Sato et al. .................... | 60/422 |
| 6,430,905 B2 | * | 8/2002 | Eis et al. ..................... | 56/11.2 |
| 6,467,553 B1 | * | 10/2002 | Wojanis ..................... | 172/812 |
| 6,494,025 B1 | * | 12/2002 | Killen et al. ................. | 56/11.1 |
| 6,619,020 B1 | * | 9/2003 | Chaney et al. ............... | 56/10.9 |
| 6,619,021 B1 | * | 9/2003 | Chaney et al. ............... | 56/10.9 |

FOREIGN PATENT DOCUMENTS

DE             3430038 A1 *  2/1986

OTHER PUBLICATIONS

Industrial Hydraulic Technology, $2^{nd}$ Ed., Parker Training, 1997, cover page and pp. 9–1, 12–9, 12–10, 13–16, 13–17.*

* cited by examiner

Primary Examiner—Thomas B. Will
Assistant Examiner—Nathan Mammen
(74) Attorney, Agent, or Firm—Brant T. Maurer; Rebecca Henkel

(57) ABSTRACT

An integrated combine reel drive system for an agricultural vehicle such as a combine harvester, the drive system having the features of a single integrated hydraulic circuit for activating multiple hydraulic devices carried by the agricultural vehicle. The integrated circuit includes a header circuit, wherein the header circuit includes a steering circuit, an implement circuit, and a reel circuit. The header circuit includes two valve stacks for operating multiple hydraulic devices which enables the integrated circuit to drive the multiple hydraulic devices using manageable hydraulic pressures. Specifically, the integrated hydraulic circuit activates a hydraulic power steering mechanism, a hydraulic header adjusting apparatus and other hydraulic devices associated with the header, a hydraulic drive for the reel, and a hydraulic positioning mechanism for the reel of an agricultural vehicle.

14 Claims, 4 Drawing Sheets

INTEGRATED COMBINE REEL DRIVE SYSTEM

FIELD OF THE INVENTION

The present invention pertains to a hydro-mechanical drive system for a combine harvester or similar agricultural vehicle. More particularly, the invention pertains to a hydro-mechanical drive system for a combine harvester that integrates the hydraulic reel drive system into the main hydraulic system to provide a single hydro-mechanical drive system for activating and operating, (i.e., driving, positioning, powering and/or controlling), the steering mechanism, header height controlling apparatus, reel positioning systems, and the reel drive system.

BACKGROUND OF THE INVENTION

In the art of mechanically harvesting crops, it is known that a harvesting vehicle, such as a combine harvester, is used to optimize crop harvesting efficiency. The combine harvester is typically a self-propelled motorized device having a motor and a combine hydro-mechanical main drive system for operationally engaging a steering mechanism, a transmission, and a header height controlling apparatus. One such combine hydro-mechanical main drive system for an agricultural vehicle is disclosed in U.S. Pat. No. 6,247,295 to Hansen et al., which is incorporated herein in its entirety by reference.

The header height controlling apparatus is a device for hydraulically controlling the height and position of a header, wherein the header is that part of the combine harvester that cuts the crop being harvested. The header height controlling apparatus usually comprises several hydraulic cylinders that hydraulically lift or lower the header in response to commands from an on board microcomputer. The header typically includes a frame, a reel assembly for pulling crops into a cutting portion or sickle assembly, a cutting portion or sickle assembly for cutting the crops, and an auger assembly for carrying the cut crop into elevator assembly or collecting chute. The reel assembly generally includes a reel supported on reel support arms, a hydraulic reel lift system comprising hydraulic cylinders for moving the reel support arms to move the reel into position when needed, and a hydraulic reel drive system for rotating the reel when in operation. One example of a header including a reel assembly is disclosed in U.S. Pat. No. 4,487,004 to Kejr, which is herein incorporated by reference in its entirety. In Kejr, the reel lift system and the reel drive system are respectively two independent hydraulic drive systems, which are separate and distinct from any main hydraulic drive system for operating components of the combine harvester, such as the steering mechanism.

In the combine harvesters of the prior art, the combine header system, the steering hydro mechanical system, system and the reel assembly hydro-mechanical drive system are separate and distinct hydraulic systems. Consequently, two or more separate hydraulic systems are built into the combine harvester during manufacture, which creates several drawbacks. First, by having multiple separate hydraulic systems, the construction of each vehicle is complicated by more parts required and more assembly steps needed during manufacture. Second, having multiple separate hydraulic systems demands more complicated and rigorous maintenance regimes once manufacturing is complete. Lastly, because each hydraulic system takes power from the vehicle engine during operation, this power drain on the engine results in higher fuel consumption and higher operating costs for the vehicle. In addition, frequently, the reel assembly is operationally disengaged, or turned off, because the particular crop being harvested does not require the operation of the reel to harvest. In these cases, valuable engine power is still expended to maintain pressures in the hydraulic reel assembly drive system, despite the fact that the reel is not performing any function.

Consequently, there is a need for an integrated combine reel drive system that operates both the combine main drive system and the reel assembly drive system, and which is constructed to conserve energy during harvesting operations whenever the reel assembly is not engaged to facilitate harvesting. The present invention endeavors to satisfy this need by providing an integrated combine reel drive system that overcomes the drawbacks of the prior art machines.

Accordingly, a primary object of the invention is to overcome the disadvantages of the prior art mechanical harvesting machines.

Another object of the present invention is to provide a mechanical harvesting machine with an integrated combine reel drive system that is practical and cost effective to manufacture.

Another object of the present invention is to provide a mechanical harvesting machine with an integrated combine reel drive system that is durable, reliable, and easy to maintain.

Another object of the present invention is to provide a mechanical harvesting machine with an integrated combine reel drive system that improves overall combine power efficiency, thereby decreasing engine fuel consumption and operating costs.

SUMMARY OF THE INVENTION

In accordance with the stated objectives, the present invention provides an integrated combine reel drive system and a mechanical harvesting machine that includes the integrated combine reel drive system, wherein the integrated combine reel drive system is a hydraulic or hydro-mechanical drive system for operating both the header and steering mechanisms of a harvester combine, and the reel assembly drive system that operates the reel of the header. Specifically, the integrated combine reel hydro-mechanical drive system of the present invention is a single integrated hydraulic circuit containing a hydraulic fluid and including a hydraulic reservoir, wherein the single hydraulic circuit includes a hydraulic header circuit connected to the reservoir and supplying hydraulic fluid to activate a header implement, a steering mechanism for the harvesting machine, and a reel of the header implement; and a variable pump connected to the reservoir and disposed in the single circuit to pump hydraulic fluid to the header circuit.

Further objects, features and advantages of the present invention will become apparent from the Detailed Description of Preferred Embodiments which follows, when considered together with the attached drawings.

DETAILED DESCRIPTION OF THE INVENTION

The present invention will now be described in terms of certain preferred embodiments that are intended to be illustrative, but not limiting. The present invention generally pertains to an agricultural vehicle, preferably a mechanical harvesting machine, more preferably a motorized combine harvester having a header implement with a reel assembly.

The invention more specifically pertains to the agricultural vehicle in combination with an integrated combine reel hydro-mechanical drive system that is operatively connected to operate various subsystems of the combine such as the header implement, steering mechanism, and the drive system for operating the reel of the header.

Figure 1:
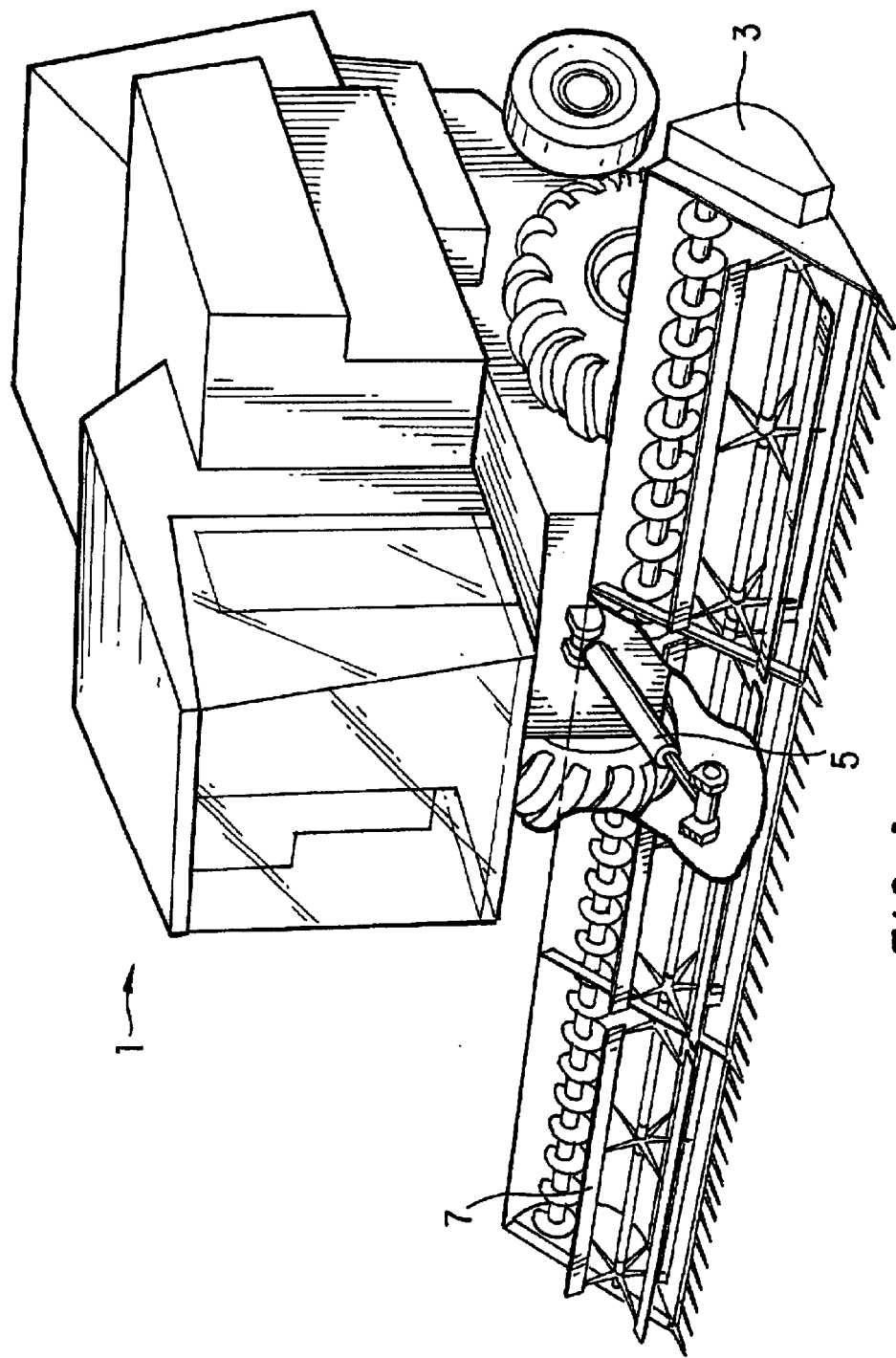
FIG. 1 is a perspective view of a combine harvester with header and reel with cut-out to show the header adjusting apparatus.

The agricultural vehicle 1, such as a combine harvester, of the present invention as shown in FIG. 1 is a motorized vehicle including a motor (not shown), a hydraulic transmission, and a header implement 3. The header implement 3 is hydraulically operated by a hydraulic header circuit 24 that controls the hydraulic cylinders of a header adjusting apparatus 5. The header adjusting apparatus 5 serves to position the header 3 for harvesting crops. The header 3 includes a rotatable reel 7 that pulls crops into the header 3 when operatively engaged in rotation. The reel 7 is hydraulically operated by a hydraulic reel circuit 44 that controls the hydraulic cylinders of a reel operating apparatus 11. The reel operating apparatus 11 serves to drive and position the reel for proper operation.

Figure 2:
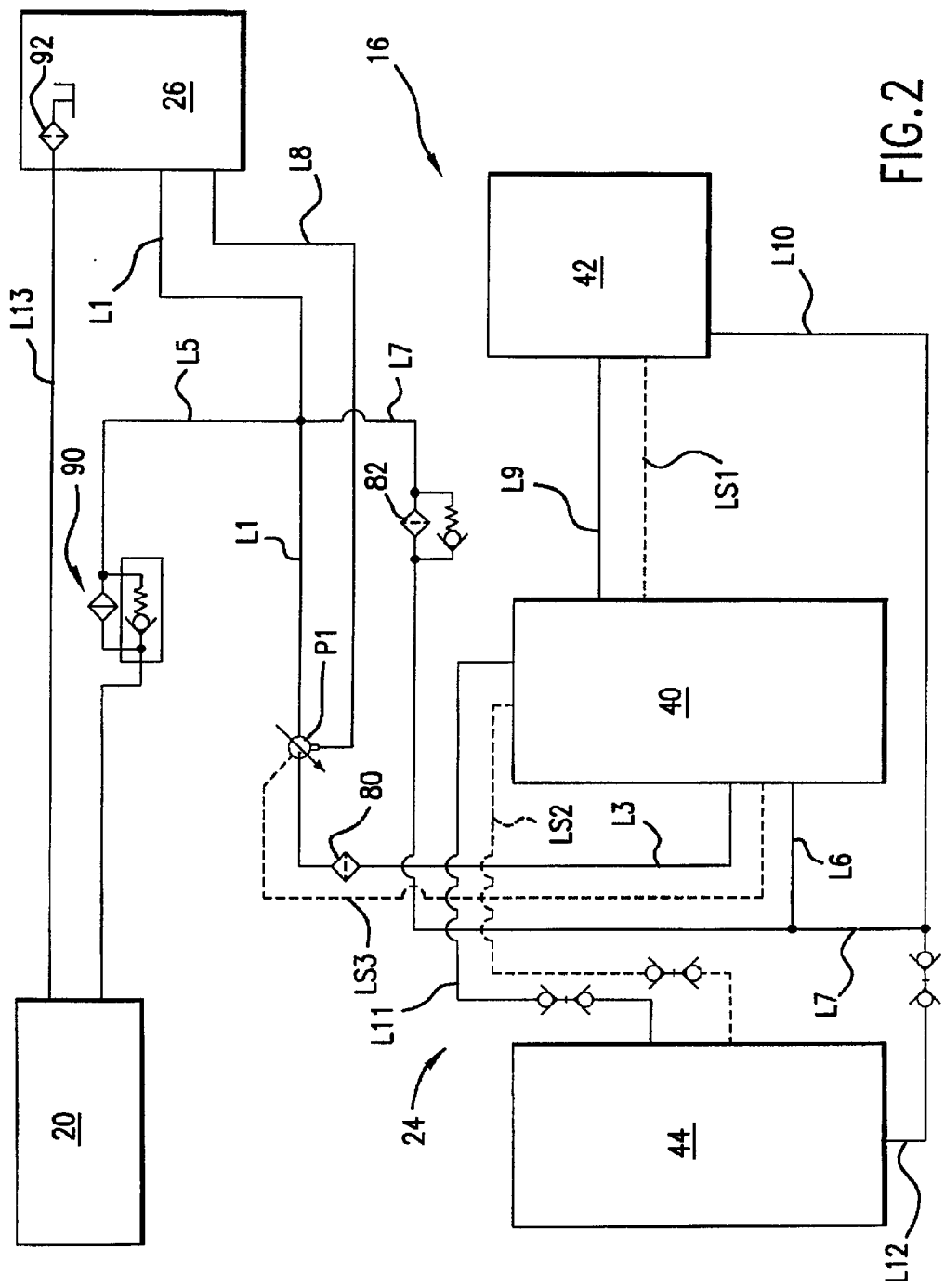
FIG. 2 is a schematic diagram showing a complete integrated hydraulic circuit for a combine harvester, which includes an embodiment of a hydraulic circuit according to the present invention, for operating the main systems of the machine integrated with a hydraulic circuit for operating the reel drive system.

The vehicle 1 includes a main hydraulic circuit 16, as shown schematically in FIG. 2. The main hydraulic circuit 16, or main circuit, provides hydraulic power for positioning and operating various apparatuses carried by the vehicle.

The main hydraulic circuit 16 includes transmission circuit 20, header circuit 24, and main hydraulic reservoir 26. Although the main hydraulic circuit 16 is not limited to having a single hydraulic reservoir, the main reservoir 26 provides hydraulic fluid for the entire circuit. The hydraulic circuit 16 is constructed of these smaller hydraulic sub-circuits because each sub-circuit performs a specific function. Specifically, the transmission circuit 20 hydraulically facilitates the operation of switching gears in the transmission as is conventionally known in the art. As is known in the art, the transmission circuit includes its own variable pump for moving hydraulic fluid through the circuit.

Figure 4:
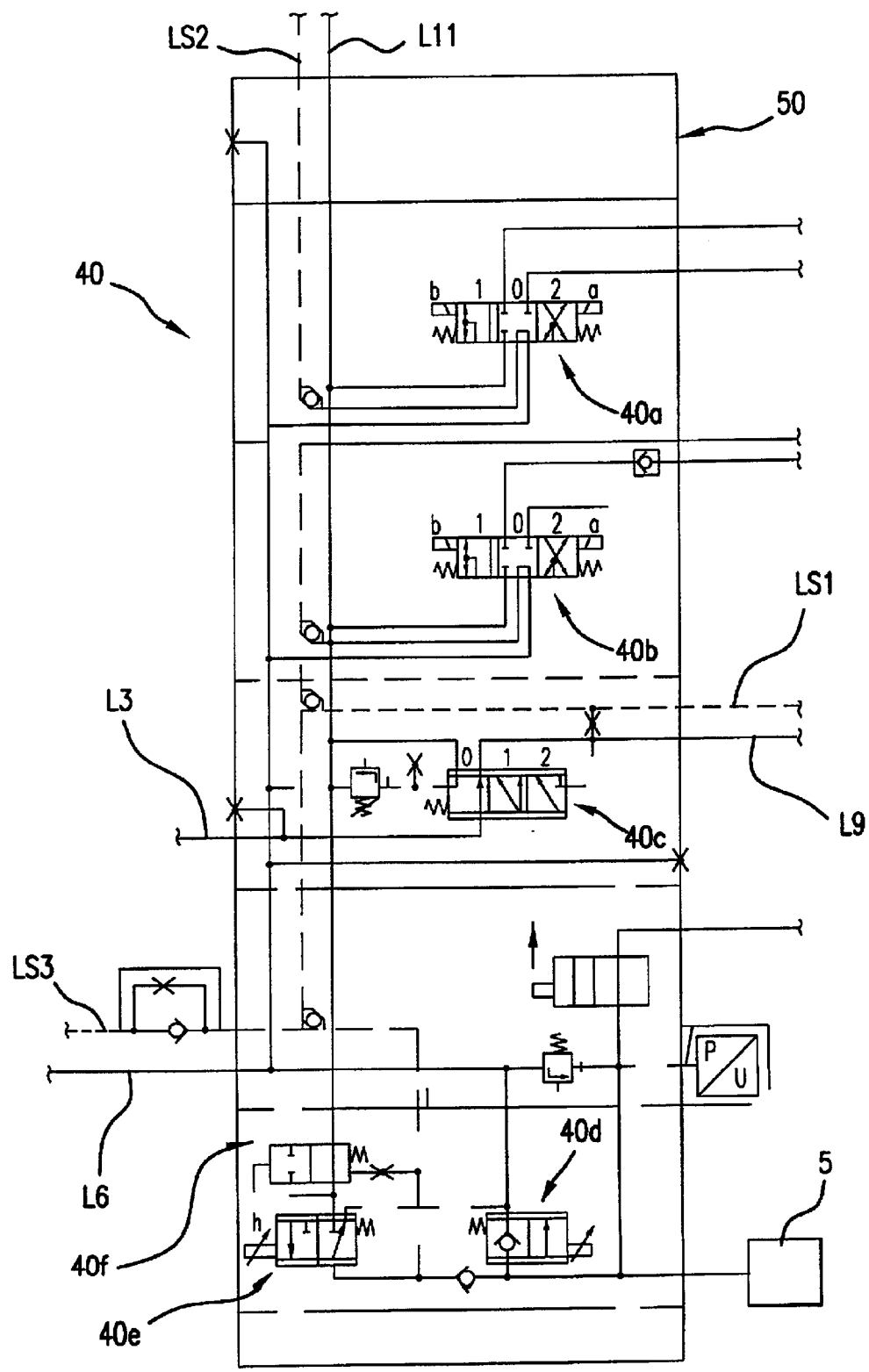
FIG. 4 is a detailed schematic diagram of an implement circuit for hydraulically operating a variable steering unit, a header adjusting apparatus, and other apparatuses related to the header.

The header circuit 24 includes the header implement circuit 40, steering circuit 42, and reel circuit 44. The implement circuit 40 hydraulically operates the implement valve stack 50 through which hydraulic power is selectively transmitted to operate various devices (not shown) carried by the header 3 and hydraulic cylinders of the header adjusting apparatus 5. See FIG. 4. The hydraulic devices (not shown) and the header adjusting apparatus 5 are connected to the implement circuit 40 through the respective remote valves 40a, 40b, 40c, 40d, 40e, 40f illustrated in the conventional valve stack 50. Some of these remote valves, such as 40a, 40b, 40d and 40e, are solenoid operated and may be controlled by the operator of vehicle 1 or by an on board computer (not shown). One important benefit of using a valve stack for activating various hydraulic devices is that by operationally connecting multiple hydraulic devices in parallel in a hydraulic circuit, lower hydraulic pressures, or loads, can be used than if all of the devices where in series.

The steering circuit 42 is well known in the art, as, for example, disclosed in U.S. Pat. No. 5,577,435 to Kowalyk, which is incorporated herein by reference in its entirety. The steering circuit 42 operates to control hydraulic cylinders to effect steering of the vehicle 1, as is well known in the art.

The reel circuit 44 includes, for example, and hydraulically operates, the reel valve stack 52 through which hydraulic power is selectively transmitted to operate various devices of the reel operating apparatus 11 connected to the reel 7. See FIG. 3. For example, the reel valve stack 52 might include a remote 5/2 solenoid operated directional valve 52a for activating the reel drive 60, where reel drive 60 serves to rotate the reel 7 and is part of the reel operating apparatus 11. 5/3 solenoid operated remote directional valves 52b, 52c, and 52d, respectively, could be used to activate the reel up/down mechanism 62, the reel fore/aft mechanism 64, and the reel tilt mechanism 66. The up/down mechanism 62, the fore/aft mechanism 64, and the reel tilt mechanism 66 are all positioning mechanisms for changing the position or orientation of the reel 7, and are part of the reel operating apparatus 11. As is conventionally known in the art, the up/down mechanism 62 and the fore/aft mechanism include respective hydraulic cylinders that move the reel 7 up or down and forward or aftward respectively in relation to the header 3. The reel tilt mechanism 66 also includes hydraulic cylinders for orienting the reel 7. As will be recognized by one skilled in the art, the reel valve stack 52 may include one or more additional hydraulic devices (not shown) connected to the reel circuit 44 through additional remote directional valves such as valve 52e. Also as will be recognized by one skilled in the art, the specific directional valves referred to herein are merely exemplary in nature, and that the invention is not limited to any specific directional valves. However, solenoid operated directional valves are preferred for activating certain hydraulic devices such as the lateral tilt mechanism 66, and the header adjusting apparatus 5 of the header circuit 24, because these valves can be wired to an electrical circuit to permit operation of the device by either the operator of the vehicle, or by an on board computer. Preferably, when a solenoid directional valve is operationally controlled by the on board computer, the on board computer selectively controls the state of the solenoid directional valve in response to data inputted by either an operator via a user interface, or in response to a preprogrammed computer subroutine, or in response to inputted data from various sensor components of the vehicle 1 and its main hydraulic circuit 16.

In operation, the variable piston pump P1 of the main circuit 16 draws hydraulic fluid on demand from reservoir 26 via hydraulic fluid conduit L8 and pumps the fluid to the header circuit 24 via hydraulic fluid conduit L3. Hydraulic fluid may also drain back to reservoir 26 via hydraulic fluid conduit L1.

Hydraulic fluid pumped by variable pump P1 into conduit L3 passes through filter 80 and enters the header circuit 24. Specifically, the hydraulic fluid from conduit L3 first enters the implement valve stack 50 of the implement circuit 40. Depending on the status of the directional valves of valve stack 50, some of which are controlled by the on board computer, various devices of the implement circuit 40 are activated by the flow of hydraulic fluid. After use, the hydraulic fluid drains from the implement valve stack 50 into hydraulic fluid conduit L6 which is connected to the hydraulic fluid conduit L7. Conduit L7 has a filter 82 for filtering the hydraulic fluid before the intersection of conduit L7 with conduit L1.

Implement valve stack 50 includes a priority directional valve 40c in series with hydraulic fluid conduit L9 for controlling the flow of hydraulic fluid to the steering circuit 42. Specifically, priority valve 40c preferentially directs hydraulic fluid flow to the steering circuit 42, and directs fluid into the remainder of the header circuit 24 only when the pump P1 provides fluid flow in excess of that required by the steering circuit 42. This safety feature ensures that the steering circuit 42 preferentially receives hydraulic fluid flow to maintain functioning of the essential steering mechanism before providing hydraulic power to less essential devices such as the header 3 and reel 7.

Hydraulic fluid returns from steering circuit 42 via hydraulic fluid conduit L10, which connects to conduit L7. The steering circuit 42 also includes a load sensing hydraulic fluid conduit, or line, LS1. Load sensing line LS1 is connected to load sensing line LS2, which is connected to the valve stacks of the implement circuit 40 and the reel circuit 44. Line LS2 is connected to load sensing line LS3 of header circuit 24. Line LS3 is connected to variable pump P1 and gives pressure feedback to pump P1 regarding the hydraulic load carried by the header circuit 24, so that the variable pump P1 can adjust the rate of hydraulic fluid flow to meet the demands of the various devices in the header circuit 24. In other words, load sensing lines LS1, LS2, and LS3 are connected to form one single contiguous load sensing line that connects the implement circuit 40, steering circuit 42, and reel circuit 44 to the variable pump P1 so that pump P1 is operationally able to sense the combined hydraulic load generated by these sub-circuits and respond accordingly to the sensed hydraulic demand (also referred to as the "load"). Functionally, pump P1 is not able to sense any one individual load placed on the header circuit 24 by any one component of the circuit because the configuration of lines LS1, LS2 and LS3 results in the transmission of only the total load generated by the whole header circuit; therefore, pump P1 senses only the total load generated in, being also the total demand required by, the header circuit 24. However, pump P1 is a load sensing flow and pressure compensated pump; therefore, pump P1 only provides the amount of hydraulic fluid flow and pressure actually required by the header circuit 24. This efficient use of hydraulic pump power is what improves the overall power efficiency of vehicle 1, thereby decreasing demands on the vehicle's engine and decreasing fuel consumption.

Figure 3:
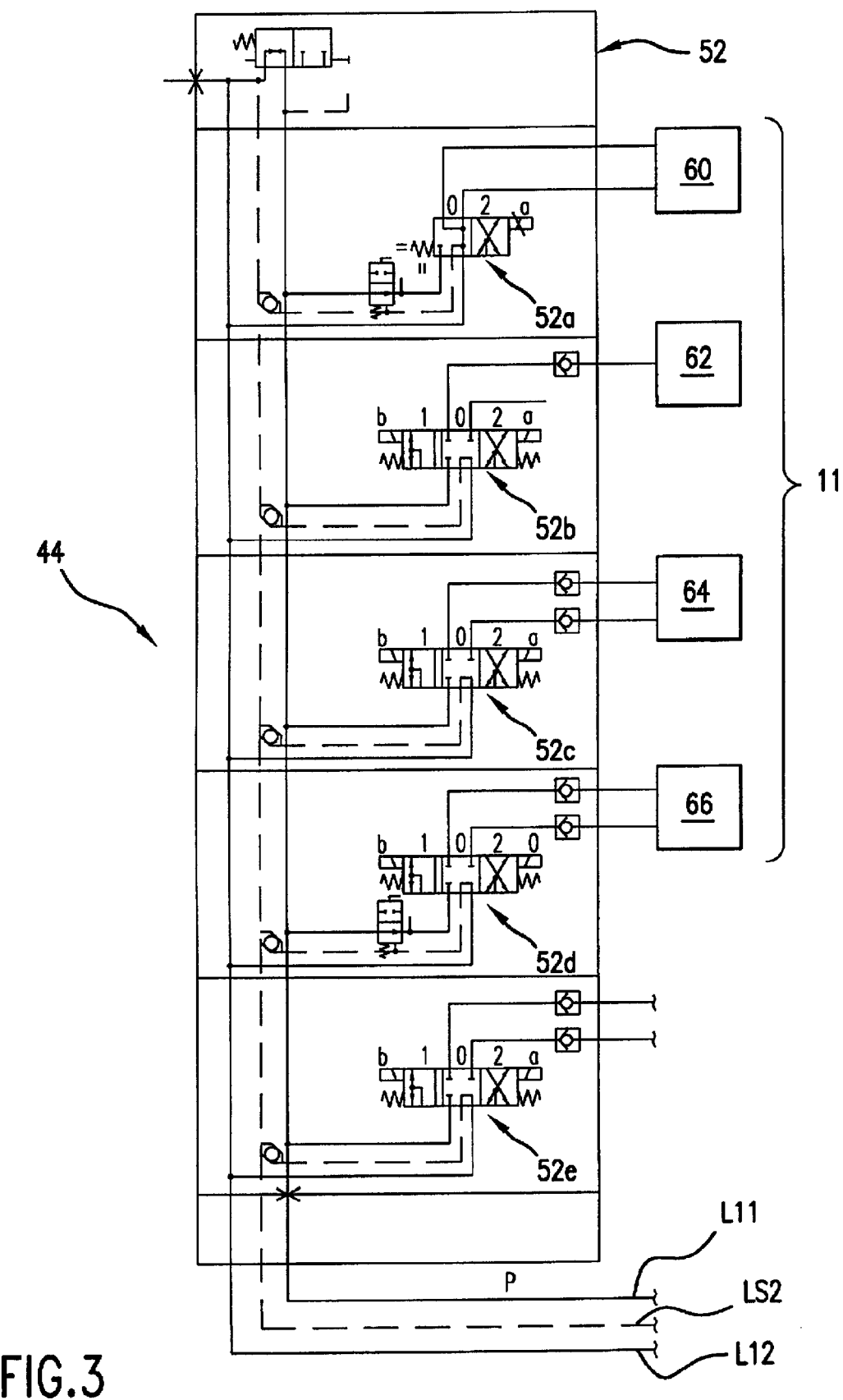
FIG. 3 is a detailed schematic diagram of a reel circuit for hydraulically operating the reel.

Hydraulic fluid conduit L11 is the intake conduit for the reel circuit 44. Hydraulic fluid is drawn from the implement circuit 40 and into the reel valve stack 52 to activate the various devices of the reel operating apparatus 11 that is connected to the reel valve stack. As shown in FIG. 3, many of the directional valves in valve stack 52 are preferentially solenoid operated directional valves that are electronically connected to respond to control signals from an on board computer. Hydraulic fluid then drains from the valve stack 52 via hydraulic fluid conduit L12, which is connected to return conduits L7 and L10. Valve stack 52 is also connected to load sensing line LS2 so that the hydraulic load carried by valve stack 52 can be sensed by variable pump P1.

Hydraulic fluid returning via conduit L7 drains into reservoir 26 via hydraulic fluid conduit L1. In addition, hydraulic fluid drain L1 receives hydraulic fluid from the transmission circuit 20 via conduit L5. A cooler 90 is connected to conduit L5 so that the hydraulic fluid can be cooled before returning to reservoir 26. It is pointed out that reservoir 26 is a common reservoir from which the hydraulic circuit 20 and the main circuit 16 draw hydraulic fluid. In all other respects, the hydraulic circuits 20 and 16 are separate. Specifically, transmission circuit 20 includes a hydraulic pump and a hydraulic motor as is conventionally known. Hydraulic fluid entering transmission circuit 20 via conduit L13 is filtered by filter 92. Main circuit 16 has pump P1 and filters 80 and 82. Hydraulic fluid leaving the transmission circuit 20 drains back to the main reservoir 26 via hydraulic fluid conduits L5 and L1. Hydraulic fluid can be drawn from reservoir 26 into pump P1 by conduit L8, or the hydraulic fluid can be drawn from the reservoir into the transmission circuit 20 via conduit L13.

Accordingly, the main hydraulic circuit 16 of the present invention provides an efficiently supply of hydraulic fluid flow to various devices carried by a motorized agricultural vehicle 1. Specifically, circuit 16 integrates hydraulic sub-circuits for activating a hydraulic power steering mechanism, a hydraulic power transmission mechanism, a hydraulic header adjusting apparatus and other hydraulic devices associated with the header, a hydraulic drive for the reel, and a hydraulic positioning mechanism for the reel, into a single combine reel drive system. One skilled in the art will realize that, from a practical standpoint, the present invention provides an economical solution to powering multiple hydraulic systems by using one single integrated hydraulic circuit, and that the use of multiple valve stacks keeps the hydraulic load on the circuit manageable despite the demands of so many hydraulic devices. Furthermore, by using a single load sensing pump P1 that can compensate the rate of hydraulic fluid flow based upon the sensed demand within a portion of the main circuit 16, the present invention places less of a power demand on the vehicle's engine, thereby reducing fuel and operating costs.

While the present invention has been clearly described with reference to certain preferred embodiments, one of ordinary skill in the art will recognize that additions, deletions, substitutions, modifications and improvements can be made while remaining within the spirit and scope of the present inventions as defined by the appended claims.

What is claimed is:

1. An agricultural vehicle including an integrated combine reel hydro-mechanical drive system, the drive system being a single integrated hydraulic circuit containing a hydraulic fluid and including a hydraulic reservoir, the single hydraulic circuit comprising:

a hydraulic header circuit connected to the reservoir and supplying hydraulic fluid to activate a steering mechanism; and a variable pump connected to the reservoir and disposed in the single circuit to pump hydraulic fluid to the header circuits, wherein the header circuit comprises an implement circuit supplying hydraulic fluid to an implement valve stack, a steering circuit supplying hydraulic fluid to activate the steering mechanism, a reel circuit supplying hydraulic fluid to a reel valve stack, as well as a load sensing line connected to the steering circuit, the implement valve stack, the reel valve stack, and to the variable pump so that a hydraulic load carried by the header circuit is sensed by the variable pump, and wherein the variable pump operates to vary the amount of hydraulic fluid pumped in response to the sensed hydraulic load.

2. An agricultural vehicle according to claim 1, wherein the implement valve stack includes a priority valve that operates to preferentially supply hydraulic fluid to the steering circuit so that the steering circuit maintains the activation of the steering mechanism.

3. An agricultural vehicle according to claim 1, wherein the reel valve stack comprises a first directional valve that operates to supply hydraulic fluid to activate a reel drive and a second directional valve that operates to supply hydraulic fluid to activate a reel positioning mechanism.

4. An agricultural vehicle according to claim 2, wherein the reel valve stack includes a first directional valve that operates to supply hydraulic fluid to activate a reel drive and a second directional valve that operates to supply hydraulic fluid to activate a reel positioning mechanism.

5. An agricultural vehicle according to claim 4, wherein the implement valve stack further includes a third directional valve that operates to supply hydraulic fluid to activate a header adjusting apparatus.

6. An agricultural vehicle according to claim 5, wherein each of the first directional valve, the second directional valve, and the third directional valve is a solenoid operated directional valve.

7. An agricultural vehicle according to claim 5, wherein each of the first directional valve, the second directional valve, and the third directional valve is a solenoid operated directional valve that is operationally controlled by an on board computer.

8. An integrated combine reel hydra-mechanical drive system for use in an agricultural vehicle, the drive system being a single integrated hydraulic circuit containing a hydraulic fluid and including a hydraulic reservoir, the single hydraulic circuit comprising:

a hydraulic header circuit connected to the reservoir and supplying hydraulic fluid to activate a header implement and a reel of the header implement; and a variable pump connected to the reservoir and disposed in the single circuit to pump hydraulic fluid to the header circuit, wherein the header circuit further comprises an implement circuit supplying hydraulic fluid to an implement valve stack, a steering circuit supplying hydraulic fluid to activate a steering mechanism, and a reel circuit supplying hydraulic fluid to a reel valve stack, as well as a load sensing line connected to the steering circuit, the implement valve stack, the reel valve stack, and to the variable pump so that a hydraulic load carried by the header circuit is sensed by the variable pump, and wherein the variable pump operates to vary the amount of hydraulic fluid pumped in response to the sensed hydraulic load.

9. An integrated combine reel hydro-mechanical drive system according to claim 8, wherein the implement valve stack includes a priority valve that operates to preferentially supply hydraulic fluid to the steering circuit so that the steering circuit maintains the activation of the steering mechanism.

10. An integrated combine reel hydro-mechanical drive system according to claim 8, wherein the reel valve stack comprises a first directional valve that operates to supply hydraulic fluid to activate a reel drive and a second directional valve that operates to supply hydraulic fluid to activate a reel positioning mechanism.

11. An integrated combine reel hydro-mechanical drive system according to claim 9 wherein the reel valve stack includes a first directional valve that operates to supply hydraulic fluid to activate a reel drive and a second directional valve that operates to supply hydraulic fluid to activate a reel positioning mechanism.

12. An integrated combine reel hydro-mechanical drive system according to claim 11, wherein the implement valve stack further includes a third directional valve that operates to supply hydraulic fluid to activate a header adjusting apparatus.

13. An integrated combine reel hydro-mechanical drive system according to claim 12, wherein each of the first directional valve, the second directional valve, and the third directional valve is a solenoid operated directional valve.

14. An agricultural vehicle including an integrated combine reel hydro-mechanical drive system, the drive system being a single integrated hydraulic circuit containing a hydraulic fluid and including a hydraulic reservoir, the single hydraulic circuit comprising:

a hydraulic header circuit connected to the reservoir and supplying hydraulic fluid to activate a steering mechanism; and a variable pump connected to the reservoir and disposed in the single circuit to pump hydraulic fluid to the header circuit, wherein the variable pump is connected to the hydraulic header circuit via a load sensing line such that a hydraulic load carried by the header circuit is sensed by the variable pump, and the variable pump operates to vary the amount of hydraulic fluid pumped in response to the sensed hydraulic load.

* * * * *